April 11, 1967
D. Q. GAREY
3,312,995
APPARATUS FOR SKINNING A CHAIN OF SAUSAGES AND THE LIKE
Filed Sept. 28, 1966
2 Sheets-Sheet 1
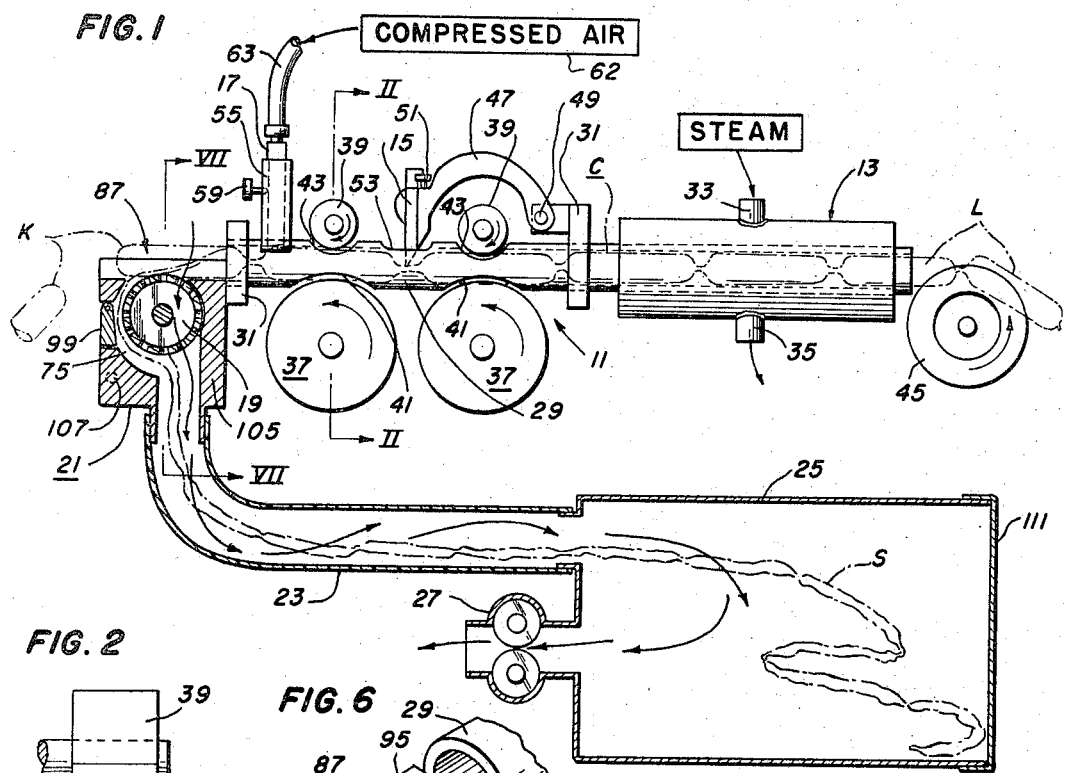
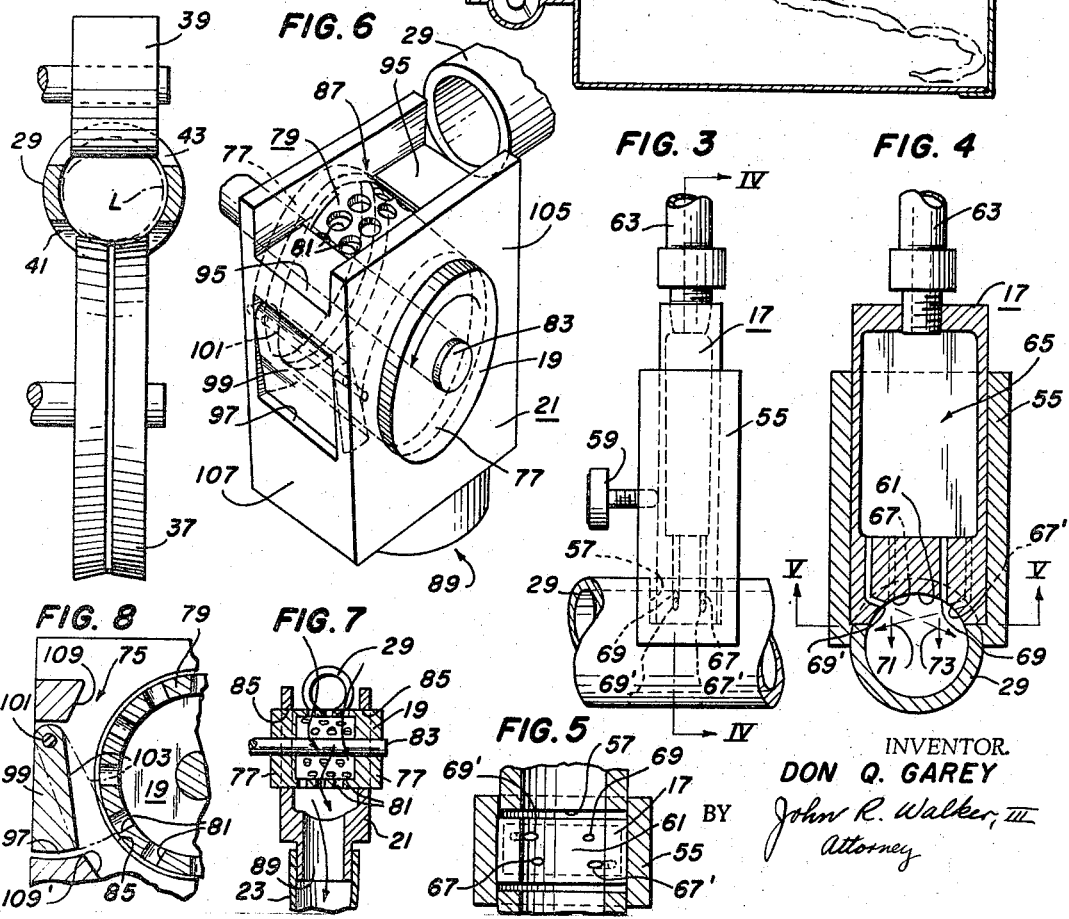
INVENTOR.
DON Q. GAREY
BY John R. Walker, III
Attorney

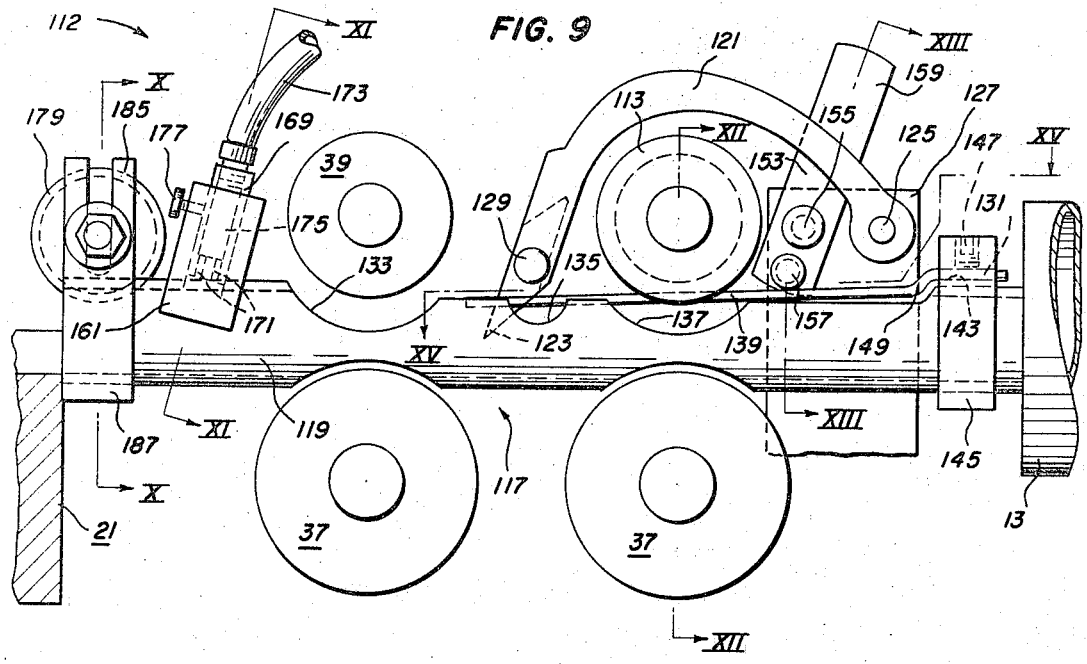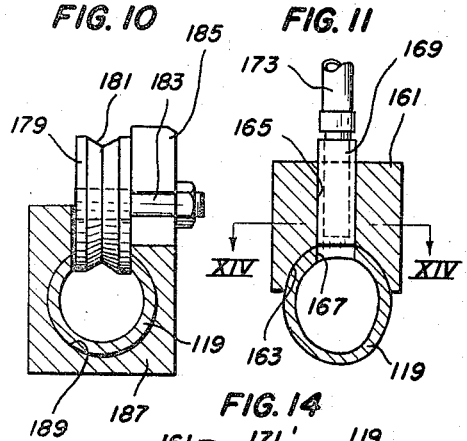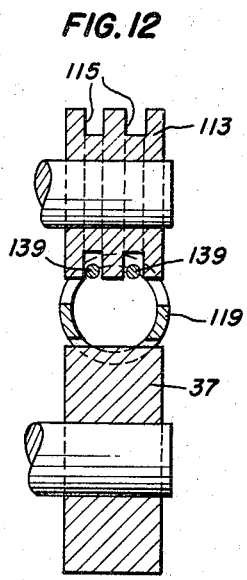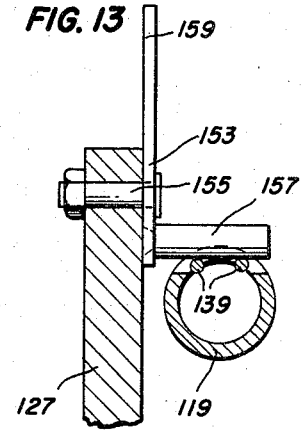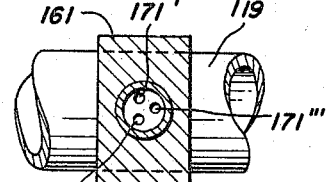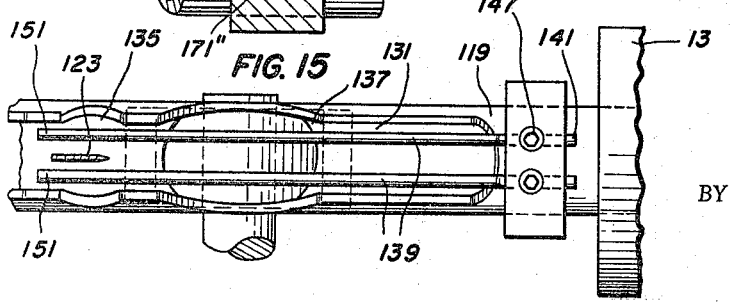

United States Patent Office 3,312,995
Patented Apr. 11, 1967

3,312,995
APPARATUS FOR SKINNING A CHAIN OF SAUSAGES AND THE LIKE
Don Q. Garey, Bartlett, Tenn., assignor, by mesne assignments, to Ranger Tool Company, Inc., a corporation of Tennessee
Filed Sept. 28, 1966, Ser. No. 584,621
13 Claims. (Cl. 17—1)

This is a continuation-in-part of my co-pending application, Ser. No. 453,319, filed May 5, 1965, now abandoned. This invention relates to apparatus for skinning a chain of sausages, frankfurters, wieners, and the like.

Certain kinds of linked sausages or wieners have a skin or casing of thin cellulose plastic material. This casing is used to hold or encase the meat while it is being cooked at the processing plant or the like. However, the plastic casing is not edible, and it must be removed from around the meat or meat kernels of each link before the meat is ready for sale to the consumer. Various apparatuses have been designed for skinning sausage links as they are connected in a chain of linked sausages. The sausage meat or meat kernels of each link of the sausage chain is separated from its respective casing, and the individual sausage meats or kernels are collected in one container, and the string of meat-free casings are collected in another container.

In the present invention, in general, five sequential processing steps may be considered as being carried out. Such steps are as follows: (1) moving the linked sausage chain in a train along a guideway or trackway; (2) heating the sausages successionally as they are moved; (3) splitting the skin casings with a sharp knife as the sausages are moved successionally under the knife; (4) loosening the inner surface of the split skin casings from the outer surface of the meat kernels of the respective sausage links; and (5) separating the loosened skin casings and meat kernels.

A primary object of the present invention is to provide a sausage skining apparatus of mechanically simple design and sturdy construction and, in such, to provide apparatus which functions effectively and with minimum maintenance and adjustment.

A further object is to provide a sausage skinning apparatus which operates rapidly and which increases considerably the number of sausages processed or skinned in a given time as compared with prior apparatuses.

A further object is to provide an apparatus requiring only negligible skill to operate efficiently.

A further object is to provide a sausage skinning apparatus which employs compressed air means in combination with a tubular trackway in a unique manner for loosening successionally the split skin casings from the meat kernels of the sausage links.

A further object is to provide such a combination of compressed air means and tubular track means in which a more effective and efficient use of the air is provided than in previous devices.

A further object is to provide a sausage skinning apparatus which includes air suction means for separating successionally the skinned kernels and the meat-free casings.

A further object is to provide a sausage skinning apparatus of such design as to be made and marketed economically.

A further object is to provide a modified embodiment of the present invention in which is provided air pressure means including nozzle means inclined relative to the tubular trackway for directing air angularly downwardly and generally in the direction of travel of the sausages to insure that the casings are removed sufficiently from the sausages, particularly the leading ends thereof, whereby when the sausages reach the air suction means the casings can be effectively separated from the meat.

A further object is to provide V-shaped means along the trackway and downstream of the compressed air means for engaging the top of the meat of the sausages to hold the sausages down and for directing the air to either side of the sausages between the meat and the casing.

A further object is to provide adjustable means adjacent the slitting means engageable with the sausages for holding the sausages down while the casings thereof are being slit.

A further object is generally to improve the design and construction of sausage skinning apparatuses.

The means by which the foregoing and other objects of the present invention are accomplished and the manner of their accomplishment will be readily understood from the following specification upon reference to the accompanying drawings, in which:

FIG. 1 is a schematic showing of the overall structure and operation of the apparatus of the present invention.

FIG. 2 is a vertical sectional view taken as on the line II—II of FIG. 1.

FIG. 3 is an elevational view of a part of the compressed air means for loosening the skin casings from the meat kernels of the sausage links.

FIG. 4 is a vertical sectional view taken as on the line IV—IV of FIG. 3.

FIG. 5 is a horizontal sectional view taken as on the line V—V of FIG. 4.

FIG. 6 is a perspective view of a part of the suction air means for separating the skin casings and the meat kernels.

FIG. 7 is a vertical sectional view taken as on the line VII—VII of FIG. 1.

FIG. 8 is an enlarged fragmentary view of a part of the suction air means of the apparatus taken as from FIG. 1.

FIG. 9 is a schematic showing of a modified form of the apparatus of the present invention.

FIG. 10 is a sectional view taken as on the line X—X of FIG. 9.

FIG. 11 is a sectional view taken as on the line XI—XI of FIG. 9.

FIG. 12 is a sectional view taken as on the line XII—XII of FIG. 9.

FIG. 13 is a sectional view taken as on the line XIII—XIII of FIG. 9.

FIG. 14 is a sectional view taken as on the line XIV—XIV of FIG. 11.

FIG. 15 is a view taken as on the line XV—XV of FIG. 9.

The overall structure of the apparatus of the present invention is considered as comprising five basic sub-structures which include: (1) a tubular trackway 11 and feed roller structure for moving the sausages in a train along the trackway; (2) a steam-heated oven 13 for heating successionally the sausages as they are moved along the trackway 11; (3) a pivotally carried edge-sharpened blade 15 for slitting the sausages longitudinally along the upper portion of each sausage; (4) compressed air means including a compressed air nozzle 17 for loosening the skin casings from the meat kernels; and (5) air suction means for separating the string of meat-free casings from the individual link meat kernels, and which air suction means includes, basically, a wheel 19 having a housing 21, a conveyor conduit 23, a container 25, and a suction pump 27. A chain of sausages C, composed of links L, is processed into individual meat kernels K and a string of meat-free casings S.

Trackway structure 11 includes a tubular member 29 and brackets 31 for securely mounting tubular member 29 in a horizontally extending disposition. The bore opening of tubular member 29 is of a sufficient size to loosely receive links L of sausage chain C. Tubular member 29 includes a forward end portion and a rearward end portion, respectively disposed toward the left and right as viewed in FIG. 1. A hollow cylindrical oven 13 is concentrically secured around the rearward end portion of tubular member 29. Oven 13 is heated by live steam entering the oven at inlet port 33 and exhausting through exhaust port 35.

Driven rollers 37 and idler rollers 39 pull the linked sausage chain C through tubular member 29. Driven rollers 37 and idler rollers 39 are opposingly arranged, and the respective upper and lower rim portions thereof turn respectively in scalloped openings 41, 43. A driven roller 37 and an idler roller 39 are diposed opposingly and engage respectively lower and upper longitudinal surface portions of each sausage link L. Driven rollers 37 are fixedly journaled relative to tubular member 29 with the respective rim portions thereof protruding upwardly slightly into the lower interior portion of tubular member 29. Idler rollers 39 are movably journaled relative to tubular member 29 and are free to move up and down respectively in scalloped openings 43. Idler rollers 39 respectively engage the upper longitudinally disposed surface portions of sausage links L. Spring means, not shown, are preferably provided for holding idler rollers 39 downwardly and to provide sufficient frictional contact between the respective sausage links L and the upper and lower rollers to move the sausage chain C through tubular member 29. The forward one of driven rollers 37 is preferably driven slightly faster than the rearward roller 37. The faster drive of the forward roller causes adjacent links of the sausage chain to be stretched apart somewhat at the joints between the respective links and thus aids blade 15 in slitting the respective end portions of the adjacent links. A flanged guide roller 45 is also included in the structure for conveying the linked sausages along trackway structure 11. Guide roller 45 is securely journaled adjacent the rearward end portion of tubular member 29 and serves to guide the sausage link chain into tubular member 29.

An arc-shaped blade carrier member 47 pivotally secures casing-slitting blade 15. A pin 49 pivotally secures carrier member 47 at the rearward end thereof to bracket 31. Blade 15 is adjustably secured at the forward end of carrier member 47 with the sharpened edge thereof disposed rearwardly. The cutting edge and the point of blade 15 project only slightly past the end surface of blade carrier member 47. The blade carrier end surface rides along on the upper surface portions of the sausage links L for limiting the cutting depth of the blade 15. A screw 51, threadedly fitted in carrier member 47 and engaging a slot in the upper end portion of blade 15, adjusts the blade relative to the carrier member and determines the depth of cut for the blade. A somewhat rectangular opening 53 is provided in the upper wall portion of tubular member 29. Opening 53 is medianly disposed between paired driven rollers 37 and idler rollers 39 and provides access into the interior of tubular member 29 for blade 15. As the sausage links L are moved successively through tubular member 29, the end portion of carrier member 47 and blade 15 ride along the upper surfaces of the sausage links and cuttingly move downwardly and upwardly between adjacent links of sausages while following the contour thereof.

Compressed air nozzle 17 is somewhat bar-shaped and of rectangular cross-section. A tubular bracket 55 is fixedly secured to the upper wall portion of tubular member 29 adjacent the forward end of the tubular member. Bracket 55 projects uprightly from the tubular member and is fixedly centered over a transversely slotted aperture 57 corresponding in size and in alignment with the tubular interior of bracket 55. Nozzle 17 is adjustably fitted in bracket 55. A screw 59 threadedly extends through bracket 55 and abuttingly engages the forward wall of nozzle 17. By manipulating screw 59, nozzle 17 may be vertically adjusted or positioned in bracket 55. The lower end of nozzle 17 is semi-circular and conforms substantially to the interior cylindrical surface of tubular member 29. The lower end portion of nozzle 17 extends through transversely slotted aperture 57 of tubular member 29 and is provided with a plurality of air jet ports having openings intersecting respectively the semi-circular surface 61 of the lower end portion of nozzle 17. The plurality of air jet openings are supplied respectively with air from a compressed air source, shown diagrammatically as at 62, and which is channeled through conduit 63 and through the hollow interior 65 of nozzle 17. The plurality of air jet openings are spaced and positioned respectively on opposite sides of tubular member 29 and in such a manner that compressed air issuing from the jet openings engages the split skin casing S of each sausage link L. The plurality of jet openings preferably include two pairs of openings 67, 67' and 69, 69', as best seen in FIG. 5. The respective ports supplying air to openings 67, 67', 69, 69' are of the same bore size or diameter, and equal amounts of air issue from each opening. The jet openings are paired and include a rearwardly disposed pair of openings 67, 67' and a forwardly disposed pair 69, 69'. The paired openings are substantially alike but contrarily arranged in such a manner that the air from each pair of openings engages respectively upper portions of the skin casing of each sausage link disposed respectively on opposite sides of the slit in the casing. The direction or extension of the respective ports in the lower portion of nozzle 17 at the opening of each pair of openings is such that air issuing from the two openings of each pair intersect. The air streams issuing from the respective jet openings are indicated by arrows in FIG. 4. Referring to this figure, it will be seen that jet streams of air issuing from the rearward pair of openings 67, 67' intersect at the point indicated by numeral 71, and streams of air from the forwardly disposed pair of openings 69, 69' intersect at the point indicated by numeral 73. Considering that FIG. 4 is a view looking toward the rearward end of tubular member 29, it will be noted that the intersecting air streams from openings 67, 67' engage and act on that portion of the casing disposed toward the left side of the slit in the casing. By the same token, it will be noted that the intersecting air streams issuing from openings 69, 69' engage and act on that portion of the casing disposed on the right side of the slit in the casing. When the apparatus is in operation and when a moving sausage is disposed underneath nozzle 17, the action of the air is as follows: Considering first the action of the air from the pair of openings 67, 67' the air jet stream from opening 67' crosses over and enters under the casing of the sausage link adjacent the slit and lifts the casing. Then, the air jet stream from opening 67, in conjunction with that from opening 67', rolls the casing back and forces the skin downwardly. In other words, the air jet stream from opening 67' primarily lifts the casing, and the air jet stream from opening 67 primarily forces it downwardly. The other two air jet streams from openings 69, 69' have the same action as that from openings 67, 67' except that they act on the casing on the opposite side of the slit in the sausage link. By having the tubular member 29, an important feature of the present invention is provided. This tubular member 29 acts as a back-up member for the casing and contains the air so that a more effective use of the air is provided. In other words, the tubular member 29 prevents the air from escaping laterally and thus causing the air to travel down around between the casing and the kernel until it reaches the bottom, and the air is caused to move longitudinally of the sausage link towards the exit at the end of the tubular member. Thus, with the present invention, less air is used than would ordinarily be required, and yet a highly efficient means is provided for loosening the casings from the kernels.

The air suction means of the apparatus of the present invention separates the loosened meat kernels K and the string of meat-free casings S. The string of casings S is moved through a curved passageway 75 in housing 21 around the outward side of wheel 19, through conveyor conduit 23, and into container 25. Wheel 19 is hollow and includes a pair of disc-like spaced members 77 interconnected by a cylindrical rim 79 having uniformly spaced perforations 81. A shaft 83, driven and supported by suitable structure, rotatively drives and supports wheel 19. Wheel 19 is arranged with the axis of rotation substantially perpendicular to trackway structure 11 and with an upper portion of cylindrical rim 79 tangentially arranged relative to the path of the sausage links or meat kernels.

Housing 21 is box-like and is preferably integrally formed of a single piece of material. Housing 21 includes a pair of openings 85 disposed in opposite side walls of the housing. Openings 85 snugly fit and turnably receive disc-like members 77 of wheel 19. An inlet opening 87 and an outlet opening 89 are disposed respectively in the upper and lower portions of housing 21 and substantially diametrically oppositely of cylindrical rim 79. The upper portion of housing 21 is trough-shaped and is disposed adjacent the forward end opening of tubular member 29 and in alignment with the tubular member. The bottom of the trough is interrupted by inlet opening 87 and is defined by a pair of bottom surfaces 95. The upper portion of perforated cylindrical rim 79 of wheel 19 is disposed in inlet opening 87; the uppermost portion of the cylindrical surface of the wheel rim preferably protrudes somewhat above bottom surfaces 95.

A substantially square-sectioned intermediate opening 97 is disposed forwardly of wheel rim 79 and communicates passageway 75 with the outside of housing 21. A snug-fitting baffle member 99 is pivotally secured in intermediate opening 97. A pin 101, extending through the upper portion of baffle member 99 and secured in housing 21, pendantly pivots baffle member 99 in intermediate opening 97. Baffle member 99 includes an inwardly disposed flat surface 103, and the lower portion of the surface is movable to tangential engagement with the cylindrical surface of wheel rim 79, as shown in broken lines in FIG. 8.

Housing 21 includes a rearwardly disposed portion 105 and a forwardly disposed portion 107, disposed respectively substantially on opposite sides of wheel 19. The interior surface of the upwardly disposed part of rearward portion 105 is cylindrical and conforms substantially to the outer cylindrical surface of rim 79. The interior cylindrical surface of rearward portion 105 is slightly spaced from cylindrical rim 79 of wheel 19. The interior surface of forward portion 107 of housing 21 defines substantially the outwardly disposed surface portion of passageway 75. The interior surface of forward portion 107 includes an upper surface portion 109 and a lower surface portion 109'. Interior surface portions 109, 109' are disposed respectively above and below intermediate opening 97 and baffle member 99. Wheel 19 is driven in a counterclockwise direction, as viewed in FIGS. 1 and 6, and in the same direction as conveyor driven rollers 37. The rim surface speed of wheel 19 is substantially equal to the rim surface speed of the forward one of driven rollers 37. Conduit 23 communicates outlet opening 89 of housing 21 with the interior of container 25. A closure member or lid 111 provides access to the interior of container 25 for the removal of the skin casings from the container.

In operation, the string of meat-free casings are sucked against the outer cylindrical perforated rim 79 of wheel 19, through passageway 75 and conveyor conduit 23, and into container 25. With reference to FIGS. 1 and 7, it will be seen that air under partial vacuum passes downwardly on opposite sides of the sausage chain C, passes through inlet opening 87 of housing 21, through the perforations in the upper portion of rim 79 and into the hollow interior of wheel 19, through the perforations in the lower portion of cylindrical rim 79, through outlet opening 89 of housing 21, through conduit 23 and into container 25, and through suction pump 27 and out into the atmosphere.

Baffle member 99 is pivotally urged toward wheel rim 79 by the partial vacuum in housing 21 acting on the inwardly disposed flat surface 103 of the baffle member. Surface 103 of baffle member 99 is pivotally moved to engage either the cylindrical surface of wheel 19 or the string of casings S, depending on whether or not a string of casings is in passageway 75 of housing 21. It should be noted that the primary purpose of baffle member 99 is to cause most of the air to pass through wheel 19 rather than around passageway 75. This causes a gripping action at the top of wheel 19 on the casings and a peeling action at the bottom of the wheel.

Referring now to the modification of the present invention shown in FIGS. 9–15 and designated in general as at 112, the modification primarily relates to the portion of the apparatus between steam heated oven 13 and the air suction means. In other words, the oven 13 is the same as in the embodiment of FIGS. 1–8 and is so designated in the drawings, the air suction means is the same, with only a portion of which is shown as at housing 21, and the portions between oven 13 and the air suction means are the only changes. Also, the driven rollers 37 and one of the idler rollers 39 are the same as in the principal embodiment and have been indicated by the same numbers. The other idler roller 113 has been modified somewhat to provide a pair of peripheral grooves 115 in the face of the roller for a purpose later to be described. In the modified apparatus a tubular trackway 117 is provided which includes a tubular member 119 corresponding to tubular member 29 of the principal embodiment and through which the sausage chain moves in the same manner.

Also, in the modified embodiment 112 an arc-shaped blade carrier 121, corresponding to blade carrier 47, supports casing slitting blade 123. A pin 125 pivotally secures carrier 121 at the rearward end thereof to suitable supporting structure, as member 127, which in turn is stationarily supported from a suitable place, as for example, the gear casing, not shown, of the apparatus. The cutting edge and point of blade 123 project only slightly past the end surface of blade carrier 121, as in the principal embodiment. The blade carrier end surface rides along the upper surface portion of the sausage links for limiting the cutting depth of the blade 123. A screw 129 is mounted on blade carrier 121 and adjustably turnable to actuate suitable clamping means, not shown, to clamp the blade 123 and adjust the cutting depth of the blade. In other words, the screw 129 performs the same function as screw 51 of the principal embodiment.

An elongated and slot-like opening 131 is provided in the upper wall portion of tubular member 119 with the opening 131 being enlarged as at 133, 135, and 137 to accommodate respectively idler roller 39, screw 129 and idler roller 113.

When the blade 123 slits the forward end of a sausage link, the blade will follow the contour of the sausage and move upwardly, as heretofore described relative to the principal embodiment. During this slitting of the forward end of the sausage link the upward movement of the blade has a tendency to move the forward end of the sausage link upwardly. To counteract this upward movement means is provided engageable with the sausage for holding the forward end of the sausage links downward while the casings thereof are being slit. This means preferably comprises the following: A pair of substantially horizontal rods 139 are provided. The proximal ends 141 of the rods 139 are anchored respectively in substantially horizontal bores 143 in a bracket 145 as by means of the set screws 147. Bracket 145 is preferably fixedly attached to tubular number 119 adjacent the rearward end thereof. Rods 139 are preferably off-set downwardly as at 149 and then extend forwardly and substantially horizontally (but at a slight angle) through opening 131 where they terminate in distal ends 151 adjacent blade 123. It will be understood that the sausage links passing through tubular member 119 will slidably contact the rods 139 which will hold the sausages downwardly.

Adjustable means are preferably provided for engaging rods 139 to push downwardly against the rods intermediate the ends thereof and hold the rods in a selective position relative to the sausage links. The adjustable means preferably comprise the following: A lever 153 is vertically mounted on supporting structure 127 as by the bolt-nut assembly 155. A pin 157 is fixedly attached to lever 153 adjacent the end of the lever and extends laterally from the lever, as best seen in FIG. 13, and engages rods 139. The upper portion 159 of lever 153 acts as a handle. Upon loosening of bolt-nut assembly 155, lever 153 can be rotated to a desired position and the bolt-nut assembly tightened so as to hold the rods 139 at the desired position. Thus, it will be understood that when lever 153 is adjusted counterclockwise from the position shown in FIG. 9, the pin 157 will push downwardly against rods 139 to cause the rods to be moved downwardly at a greater angle relative to the horizontal, and when the lever is adjusted clockwise, the rods will be moved upwardly. It will be understood that the grooves 115 in idler roller 113 permit the above-mentioned adjustment of the rods 139 without interference from the idler roller.

The compressed air means of modified embodiment 112 is preferably as follows: A block 161 has a substantially semi-cylindrical cut-out portion 163 on the lower end thereof which fits over the top of tubular member 119 with the block 161 being fixedly secured to the tubular member. From member 119, block 161 is angled upwardly and rearwardly as best seen in FIG. 9 and is provided with a bore 165 along the longitudinal center line thereof which mates with an opening 167 in the upper wall of tubular member 119 to provide a socket which receives the cylindrical nozzle 169.

A plurality of air jet ports 171 are provided in the lower end of nozzle 169. The plurality of air jet ports 171 are supplied respectively with air from a compressed air source, not shown, and which is channeled through conduit 173 and through the hollow interior 175 of nozzle 169. Air jet ports 171 are parallel to the axis of nozzle 169 and block 161, that is, they are inclined rearwardly relative to trackway 117 for directing the air angularly downwardly in the direction of travel of the sausages through the trackway and into the slit in the sausage casings to loosen the casings and to insure such loosening particularly on the leading ends of the sausages. The plurality of jet ports 171 are preferably three in number and preferably arranged as best seen in FIG. 14 so that there is one jet port shown as in 171' on one side of the nozzle, another jet port shown as in 171" on the other side of the nozzle, and a third jet port 171''' behind and between the two forward pairs of jet ports 171' and 171" and along the middle of the trackway 117. The air jet port 171' directs air downwardly and forwardly along one side of the sausage between the casing on that side and the meat kernel of the sausage, the jet port 171" directs the air downwardly and forwardly on the other side of the sausage between the casing on that side and the meat kernel, and the air jet port 171''' directs the air downwardly and forwardly on top of the sausage to insure the casing loosening particularly on the leading end of the sausage so that when the sausage reaches the air suction means, the casing will be definitely off the end of the sausage so that it can be effectively separated from the meat kernel. As in the principal embodiment a combination of the tubular member 119 with the compressed air is an important feature of the present invention. In other words, the tubular member 119 acts as a backup member for the casing and contains the air so that a more effective use of the air is provided in the separation of the casing from the meat kernel and particularly in insuring that complete separation of the casing from the sausages on the leading ends thereof is provided. In the operation of the apparatus 112 an unusual phenomenon of the effect of the air on the casing can be observed; thus, in viewing rearwardly through the tubular member 119 the casing can be seen to stand away not only from the meat kernel but also the tubular member 119. Some of the air apparently acts as a cushion between the casing and the tubular member 119. Also, the air is caused to travel down around between the casing and the kernel until it reaches the bottom and then it is caused to move longitudinally of the sausage length toward the exit or forward end of the tubular member.

Adjustability of nozzle 169 is provided by a screw 177 that threadedly extends through block 161 and engages the wall of nozzle 169 to hold it in a selected vertical position. In addition, it is contemplated that the sizes and lengths of air jet ports 171 can be varied and the air pressure varied for further adjustment.

V-shaped means is provided along trackway 117 forwardly of nozzle 169 for engaging the top of the kernel of the sausages to hold the sausages down and for directing the compressed air to either side of the sausages between the meat kernel and the casing. This V-shaped means may be in any suitable form, either stationary with the sausages sliding thereon or rollable, as shown in FIGS. 9 and 10, wherein it will be seen the V-shaped means comprises a roller 179 having a V-groove 181 in the rim thereof. Roller 179 is rotatably mounted on a shaft 183 which in turn is adjustably supported for vertical adjustment in the bifurcated upper portion 185 of a bracket 187 which in turn is supported from tubular member 119 as by the tubular member extending through a horizontal bore 189 therein. It will be understood that the compressed air will hit against the roller 179 and the V-groove 181 and will be deflected to either side of the sausages between the kernel and the casing.

The apparatus of the present invention is substantially mechanically simple, with a minimum number of intricate and complicated mechanisms to get out of order; it requires minimum maintenance and adjustment, and is easy to operate. The apparatus performs rapidly, consistently and accurately, and many sausage links or chains can be processed in a given time. In summary, the present invention provides a very practical apparatus for skinning the sausage links of a chain of linked sausages.

Although the invention has been described in some detail by way of illustration and example for purposes of clarity or understanding, it is to be understood that it is not to be so limited since changes and modifications may be made therein which are within the full intended scope of this invention as hereinafter claimed.

I claim:

1. Apparatus for skinning a chain of sausages and the like comprising trackway structure, means for conveying the sausages successionally along said trackway structure in a moving chain of sausages, means for slitting successionally the skin casings of the moving chain of sausages, compressed air means including means providing crossed air streams directed towards opposite sides of the sausages and under the casings thereof adjacent the slit in the skin casings for the lifting thereof and including means providing air streams directed downwardly to urge the skin casings downwardly on either side of the sausages, said trackway structure including tubular means surrounding the sausages while being subjected to said air streams for acting as back-up means to contain the air and cause the air to move longitudinally of the sausages and provide an effective use of air, and air suction means for remotely separating successionally the meat kernels and the skin casings of the chain of sausages.

2. Apparatus for skinning a chain of sausages and the like comprising trackway structure, means for conveying the sausages successionally along said trackway structure in a moving chain of sausages, means for heating successionally the moving chain of sausages, means for slitting successionally the skin casings of the moving links of sausages, compressed air means for loosening successionally the split skin casings from the meat kernels of the sausages, said trackway structure including tubular means surrounding the sausages while being subjected to said air means for acting as back-up means to contain the air and cause the air to move longitudinally of the sausages and provide an effective use of air, and air suction means for remotely separating successionally the meat kernels and the skin casings of the chain of sausages.

3. The sausage skinning apparatus of claim 2 in which said compressed air means includes air nozzle structure provided with two pairs of jet openings with the two openings of each pair of openings being respectively arranged in such a manner that compressed air jet streams issuing respectively from said two openings intersect, the two paired jet openings being respectively arranged in such a manner that the two intersecting jet streams of air issuing respectively from each pair of openings engage respectively the inner surface of the skin casings along portions of the casings disposed adjacent and on opposite sides of the slit of each casing, said jet streams entering successionally between said skin casings and said meat kernels of the moving chain of sausages.

4. Apparatus for skinning a chain of sausages and the like comprising a substantially tubular trackway through which the sausages are moved, means spaced along said trackway engageable with the chain of sausages for conveying said sausages through said trackway, steam means along said trackway for heating the moving chain of sausages, slitting means along said trackway engageable with said chain for longitudinally slitting the cases of the moving chain, compressed air means including a nozzle mounted above said tubular trackway for loosening the slit casings from the enclosed meat, said nozzle having a semi-circular lower end portion extending into and conforming with the interior surface of said tubular trackway, said lower end portion having a plurality of circumferentially spaced air jet ports therein positioned to project air in an intersecting stream into the slit in said casing and air suction means at the end of said trackway for engaging the slit and loosened casing and removing it from the enclosed meat.

5. Apparatus for skinning a chain of sausages and the like comprising trackway structure, means for conveying the sausages successionally along said trackway structure in a moving chain of sausages, means for slitting successionally the skin casings of the moving chain of sausages, means for loosening successionally the slit skin casings from the meat kernels of the sausages; and means for separating successionally the meat kernels and the skin casings of the sausages comprising a hollow wheel having a perforated rim, means rotatably mounting and driving said wheel with the axis of rotation being substantially perpendicular to said trackway structure, said rim of said wheel being substantially tangentially arranged relative to the path of the sausages, a housing having an inlet opening and an outlet opening, said housing substantially enclosing said wheel but with a portion of said perforated rim being disposed in said inlet opening, the interior surface of said housing disposed on one side of the axis of said wheel being spaced only slightly from said rim of said wheel, the interior surface of said housing disposed on the other side of the axis of said wheel being spaced from said wheel and defining a passageway extending between said inlet opening and said outlet opening of said housing, a container, a conduit connecting said housing outlet opening with the interior of said container; and suction pump means for moving air through said housing inlet opening, into and out of the hollow interior of said wheel through the perforations of said rim, through said housing outlet opening and into said conduit, and into and out of said container; in operation, the string of loosened meat-free casings being sucked against the outer cylindrical perforated rim surface of said wheel and moved through said passageway of said housing, through said conduit, and into said container, said means for separating the loosened skin casings from the meat kernels of the sausage chain additionally including yieldable means for bearing against the skin casings to cause most of the air to move through said wheel rather than through said passageway.

6. Apparatus for skinning a chain of sausages and the like comprising trackway structure, means for conveying the sausages successionally along said trackway structure in a moving chain of sausages, means for slitting successionally the skin casings of the moving chain of sausages, means for loosening successionally the slit skin casings from the meat kernels of the sausages; and means for separating successionally the meat kernels and the skin casings of the sausages comprising a hollow wheel having a perforated rim, means rotatably mounting and driving said wheel with the axis of rotation being substantially perpendicular to said trackway structure, said rim of said wheel being substantially tangentially arranged relative to the path of the sausages, a housing having an inlet opening and an outlet opening, said housing substantially enclosing said wheel but with a portion of said perforated rim being disposed in said inlet opening, the interior surface of said housing disposed on one side of the axis of said wheel being spaced only slightly from said rim of said wheel, the interior surface of said housing disposed on the other side of the axis of said wheel being spaced from said wheel and defining a passageway extending between said inlet opening and said outlet opening of said housing, a container, a conduit connecting said housing outlet opening with the interior of said container; and suction pump means for moving air through said housing inlet opening, into and out of the hollow interior of said wheel through the perforations of said rim, through said housing outlet opening and into said conduit, and into and out of said container; in operation, the string of loosened meat-free casings being sucked against the outer cylindrical perforated rim surface of said wheel and moved through said passageway of said housing, through said conduit, and into said container, said means for separating the loosened skin casings from the meat kernels of the sausage chain additionally including baffle member means movably secured in an intermediate opening intersecting said passageway and communicating said passageway with the outside of said housing; under the influence of a partial vacuum in said housing caused by said suction pump means, said baffle member being movable into said passageway and disposed contiguous with said perforated rim of said wheel.

7. Apparatus for skinning a chain of linked sausages and the like comprising trackway structure, means for conveying the sausages successionally along said trackway structure, means for slitting successionally the skin casings of the moving sausages, means for loosening successionally the split skin casings from the meat kernels of the sausages; and means for separating successionally the meat kernels and the skin casings of the chain of sausages comprising a hollow wheel having a perforated rim, means rotatably mounting said wheel with the axis of rotation substantially perpendicular to said trackway structure and with said rim of said wheel being substantially tangentially arranged relative to the path of the chain of sausages, a housing having an inlet opening and an outlet opening, said housing substantially enclosing said wheel but with a portion of said perforated rim being disposed in said inlet opening, the interior surface of said housing on one side of the axis of said wheel being disposed only slightly from the rim of said wheel, the interior surface of said housing disposed on the other side of said axis and on that side opposite from said first-mentioned side being spaced from said wheel rim and defining a passageway extending between said inlet opening and said outlet opening of said housing, said housing also including an intermediate opening intersecting said passageway, said intermediate opening communicating said passageway with the outside of said housing, a baffle member having a substantially flat surface, said baffle member being pivotally secured in said intermediate opening with said substantially flat surface disposed toward said wheel and with the pivot axis of said baffle member being substantially parallel to the axis of rotation of said wheel, said baffle member being disposed in such a manner that under the influence of a partial vacuum in said housing said baffle member is pivotable into said passageway with said substantially flat surface contiguous with said perforated rim of said wheel, a container, a conduit connecting said housing outlet opening with the interior of said container; and suction pump means for moving air through said housing inlet opening, into and out of the hollow interior of said wheel through the perforations of said wheel rim, through said housing outlet opening and through said conduit, and into and out of said container; in operation, the string of meat-free casings being sucked against portions of the outer cylindrical perforated rim surface of said wheel and moved through said passageway of said housing, through said conduit, and into said container.

8. Apparatus for skinning a chain of linked sausages and the like comprising trackway structure, means for conveying the sausages successionally along said trackway structure, means for slitting successionally the skin casings of the moving sausages, compressed air means for loosening successionally the split skin casings from the meat kernels of the sausages; said trackway structure including tubular means surrounding the sausages while being subjected to said air means for acting as back-up means to contain the air and cause the air to move longitudinally of the sausages and provide an effective use of air; and means for separating successionally the meat kernels and the skin casings of the chain of sausages comprising a hollow wheel having a perforated cylindrical rim, means rotatably mounting said wheel with the axis of rotation being substantially perpendicular to said trackway structure and with a portion of said cylindrical rim being tangentially arranged relative to the path of the chain of sausages; a housing having a first portion, an oppositely disposed second portion, an inlet opening, and an oppositely disposed outlet opening; said housing substantially enclosing said wheel but with said portion of said cylindrical rim being disposed in said inlet opening of said housing, said first and second portions of said housing being disposed on opposite sides of the axis of said wheel, said first portion having an interior surface conforming substantially to the outer cylindrical surface of said rim of said wheel, said interior surface being spaced only slightly from the cylindrical surface of said rim, said second portion of said housing having an interior surface conforming substantially to the outer cylindrical surface of said rim but spaced a sufficient distance from said rim to define a curved passageway between said wheel and said second portion and communicating said inlet and outlet openings of said housing, a conduit communicating with said housing outlet opening; and suction pump means communicated with said conduit for moving air through said housing inlet opening, into and out of the hollow interior of said wheel through the perforations in said rim, through said housing outlet opening and through said conduit; in operation, the string of meat-free casings being sucked against portions of the outer cylindrical perforated rim surface of said hollow wheel and moved through said passageway of said housing and through said conduit.

9. Apparatus for skinning a chain of sausages and the like comprising a substantially tubular trackway through which the sausages are movable, means spaced along said trackway engageable with the chain of sausages for conveying said sausages through said trackway, steam means along said trackway for heating the moving chain of sausages, slitting means along said trackway engageable with said chain for longitudinally slitting the casings of the moving chain, compressed air means including nozzle means having a plurality of jet ports communicating with the interior of said tubular trackway and rearwardly inclined relative to said trackway for directing air angularly downwardly and generally in the direction of travel of the sausages through said trackway and into the slit in the sausage casings with at least one of said jet ports being along the middle of said trackway as well as being rearwardly inclined to direct air directly on top of the sausage to loosen the casings and to insure such loosening particularly on the leading ends of the sausages, and air suction means adjacent the end of said trackway for engaging the loosened casings and removing them from the enclosed meat kernels.

10. The apparatus of claim 9 in which is included V-shaped means along said trackway adjacent and downstream of said air means for engaging the top of the meat kernel of the sausages to hold the sausages down and for directing the air to either side of the sausages between the meat kernels and the casings thereof.

11. The apparatus of claim 9 in which is included means adjacent said slitting means engageable with the sausages for holding the sausages down while the casings thereof are being slit.

12. The apparatus of claim 11 in which said means adjacent said slitting means comprises a pair of substantially horizontal rods each having a proximal end and a distal end, means fixedly anchoring said proximal ends of said rods with said rods extending into the interior of said tubular trackway in position to be slidably engaged by the sausages and with said distal ends of said rods being adjacent said slitting means, and means adjustably engaging said rods for pushing downwardly against said rods intermediate the ends thereof to hold said rods in a selected position relative to the sausages.

13. The apparatus of claim 12 in which said means adjustably engaging said rods comprises a lever, a pin attached to one end of said lever, and means pivotally mounting said lever for movement in one direction to move said pin downwardly against said rods and for movement in the opposite direction to move said pin upwardly.

References Cited by the Examiner
UNITED STATES PATENTS

| 2,463,157 | 3/1949 | Deitrickson | 17—1 |
| 2,623,237 | 12/1952 | Schaller | 17—1 |
| 2,779,968 | 2/1957 | Hensgen | 17—1 |
| 2,800,861 | 7/1957 | Demarest | 17—1 |
| 3,023,452 | 3/1962 | James et al. | 17—1 |

LUCIE H. LAUDENSLAGER, *Primary Examiner.*